of Letters Patent.

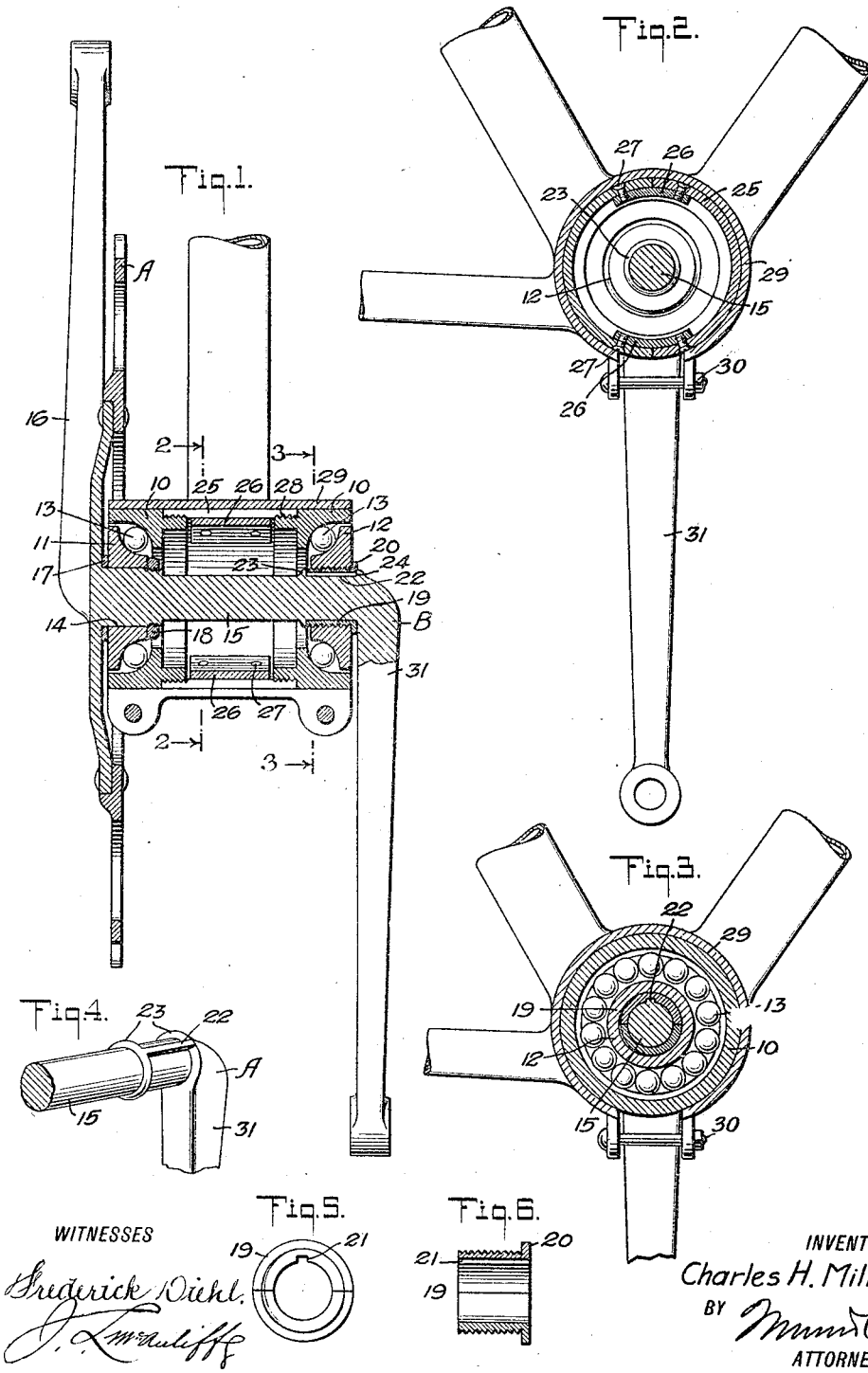

UNITED STATES PATENT OFFICE.

CHARLES HENRY MILLER, OF KANSAS CITY, MISSOURI.

CRANK-HANGER BEARING.

1,288,956.                    Specification of Letters Patent.      Patented Dec. 24, 1918.

Application filed October 8, 1918. Serial No. 257,317.

*To all whom it may concern:*

Be it known that I, CHARLES H. MILLER, a citizen of the United States, and a resident of Kansas City, in the county of Jackson and State of Missouri, have invented a new and Improved Crank-Hanger Bearing, of which the following is a description.

My invention relates more particularly to one-piece crank hangers for bicycles. In the old-type hangers of the one-piece design, the assembling of the cone and the inserting of the crank shaft in the hanger necessitated that the cone and its component parts be set off from the crank from five-eighths to three-quarters of an inch in order to permit of their being brought around the crank with the shaft, thereby drawing the ball races close together, increasing the leverage stress on the cups, balls and cones, as well as increasing the friction with its resultant troubles and preventing a narrow tread.

The general purpose of my invention is to overcome the objections noted and this I attain by a bearing characterized by a divisible cone seat, together with a divisible assembly sleeve which is so coördinated with the shaft and cranks as well as with the cups, that the whole may be readily assembled on the shaft and the latter with its crank slipped in position in the slotted hanger, the arrangement resulting in a wider space between the ball races, a more rigid shaft, an annular tread, with less stress on the cones, balls and cups, as well as less wear and reduced friction, and consequently easier running.

Reference is to be had to the accompanying drawings forming a part of this specification, it being understood that the drawings are merely illustrative of one example of the invention.

Figure 1 is a longitudinal vertical section of a crank hanger equipped with my invention;

Fig. 2 is a cross section on the line 2—2, Fig. 1;

Fig. 3 is a cross section on the line 3—3, Fig. 1;

Fig. 4 is a fragmentary perspective view at the angle of the shaft and crank;

Fig. 5 is an end view of the divisible cone seat;

Fig. 6 is a longitudinal vertical section of the device shown in Fig. 5.

In carrying out my invention in accordance with the illustrated example, cups 10 are provided which may be in general of known form, associated with which are cones 11 and 12, coacting with the cups to form races for the balls 13. The seat 14 for the cone 11 adjacent to the sprocket wheel and to one crank 16 is integral with the shaft 15, a washer 17 and a nut 18 being employed at opposite sides of said cone to maintain the latter at the correct distance from the adjacent crank.

The cone 12 at the opposite end of the shank is divisible, being composed of a conical body of unbroken continuity annularly, and a separate split bushing 19 presenting two half sections, said bushing being externally threaded as clearly shown in Figs. 1 and 6 and the body of the cone 12 having a corresponding internal thread. The bushing 19 has an annular radial flange at the outer end to contact with the outer side of the body and thus to determine their relative positions. Also, said bushing has a longitudinal groove 21 to receive a longitudinal rib or feather 22 on the adjacent end of the shaft 15, said shaft having an annular bead 23 at the inner end of the rib 22 and therefore at the inner end of the divisible cone 12, there being a corresponding bead 24 on the shaft at the outer end of the rib 22.

Between and fitting about the cups 10 is a divisible sleeve 25 split longitudinally to present two half sections as best seen in Fig. 2, said sleeve being provided at the interior with arcuate plates 26 adjacent to the meeting edges of the sleeve sections and crossing the joints. Said sleeve sections are secured to the plates 26 by screws 27. The outer ends of which are flush with the cylindrical exterior surface of the sleeve 16 while the plates 26 curve to correspond with the interior surface of the sleeve.

With the described construction the cones and cups may be passed over the crank arm 31 at the opposite end of the shaft from the sprocket wheel A and may pass in succession about the angle B formed by said crank arm and the shaft 15, the diameter of the cones and cups permitting them to clear said angle. After the cones and cups have made this angle, the cone 11 having been positioned on its seat 14 through the medium of the washer 17 and nut 18, the cups 10 may be brought temporarily into sufficiently close relation for the cone body 12 to be in a position on the shaft 15 inward from the angle B. The split bushing or cone seat 19 is now positioned between the beads 23, 24, and engaging the rib 22, the conical body of the cone 12 is then run backward onto the bushing 19 until it comes to a bearing against the flange 20. The balls and the cups 10 are now properly positioned relatively to the cones 11, 12 and the sectional sleeve 25 is then brought into position with its internally threaded ends engaging the threads on the oppsed reduced ends of the cups 10 as indicated at 28, so that the fastening of the screws 27 securely holds all the parts of the bearing in assembled form. With the assembled sleeve sections engaging the reduced threaded ends of the cups 10, said cups and the sleeve will form part of the same cylindrical surface. It is to be understood that the bearing is assembled as described on the shaft 15 and the shaft and bearing then slipped lengthwise into the slotted hanger 29 which is of known form having the bolts 30 for drawing the flanged ends together.

By the described arrangement, an ample distance may be preserved in practice between the respective ball races to give a rigidity to the shaft beyond that obtained by the closely positioned cone bearings of usual form and otherwise the defects outlined above as characterizing known types of bearings are overcome.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A bearing including cups, and cones coacting therewith to form ball races, one of said cones being divisible and comprising a conical body, and a bushing divided longitudinally into sections adapted to be applied laterally to a shaft, said body of the cone fitting over the assembled bushing sections.

2. A bearing including cups and cones coacting with the respective cups to form ball races, one of said cones comprising an interiorly threaded cone body, and an exteriorly threaded bushing forming the seat for said body and composed of sections separable laterally; together with a shaft and coacting means on said shaft and bushing to prevent relative turning movement thereof.

3. The combination with a crank shaft, of cups, and cones on said shaft and coacting to form ball races, one of said cones comprising a cone body of unbroken continuity and a bushing therefor, said body having a bore sufficiently large to pass onto said shaft from one cranked end thereof and take the angle formed by the shaft and the adjacent crank, said bushing being divided longitudinally into half sections adapted to be assembled on the shaft or disassembled by relative lateral movement; together with means to prevent relative turning of the shaft and bushing.

4. A bearing including cups, cones coacting with the respective cups to form ball races, said cups having reduced threaded ends, and a sleeve divided longitudinally to present separate sections, the assembled sections being engageable with said cups to maintain the same in their proper relative positions, said sleeve and the cones, except the reduced ends of the latter, forming part of the same cylindrical surface.

5. A bearing including cups, cones coacting with the respective cups to form ball races, and a sleeve divided longitudinally into separate sections, the assembled sections being adapted to fit about the opposed ends of said cups.

6. A bearing including cups, cones coacting with the respective cups to form ball races, and a sleeve divided longitudinally into separate sections, the assembled sections being adapted to fit about the opposed ends of said cups; together with arcuate plates within said sleeve at the meeting edges and fastening means to connect the sleeve sections and plates.

7. A bearing including cups, cones coacting with the respective cups to form ball races, one of said cones having a conical annular body, and a bushing divided longitudinally in sections to be applied to a shaft or removed therefrom laterally; and a sleeve divided longitudinally into sections and fitting about the opposed ends of the respective cups, said sleeve and cups having mating threads.

8. A combination with a crank shaft, of a bearing therefor adapted to be accommodated in a crank hanger or the like, said shaft having at one end an integral annular seat, a cone fitting said seat, means to position said cone on said seat relatively to the adjacent end of the shaft, said shaft having at its opposite end a diameter less than the said integral seat, a divisible cone at said opposite end of the shaft and comprising a sectional bushing and a cone body threaded onto said sectional bushing, means to prevent relative turning of said divisible cone and shaft, a cup coacting with the first cone to form a ball race, a second cup coacting with the divisible cone to form a ball race, said second cup being adapted to be moved longitudinally of the shaft toward the first cup to allow clearance for the cone body of the second cone in engaging and disengaging said bushing, and a sleeve divided longitudinally into sections adapted to be assembled or disassembled by a lateral movement relatively to each other and to the shaft, the assembled sleeve sections fitting about adjacent ends of the cups and having means to engage the latter.

9. A bearing including cups, cones coacting therewith to form ball races, one of said cones being divisible and comprising a cone body, and a separate bushing divided longitudinally into sections adapted to be applied laterally to a shaft, said cone body being internally threaded and the bushing having external mating threads, the bushing furthermore having at its outer end a flange to limit the relative movement of the bushing and body.

10. The combination with a shaft, of a bearing including cups on the shaft, cones coacting with said cups to form ball races, one of said cones comprising a cone body and a bushing divided longitudinally into sections adapted to be applied laterally to the shaft, the interior of said cone body and the exterior of the bushing having mating threads, said shaft having a longitudinal rib and the bushing having a groove to receive said rib, there being beads on the shaft at the opposite ends of said rib.

CHARLES HENRY MILLER.

Copies of this patent may be obtained for five cents each, by addressing the "Commissioner of Patents, Washington, D. C."